(12) United States Patent
Nishimoto et al.

(10) Patent No.: US 11,184,137 B2
(45) Date of Patent: Nov. 23, 2021

(54) LOWER RADIO BASE STATION, HIGHER RADIO BASE STATION, AND RADIO BASE STATION SYSTEM

(71) Applicant: MITSUBISHI ELECTRIC CORPORATION, Tokyo (JP)

(72) Inventors: Hiroshi Nishimoto, Tokyo (JP); Akinori Taira, Tokyo (JP); Shigeru Uchida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/605,478

(22) PCT Filed: Jun. 27, 2017

(86) PCT No.: PCT/JP2017/023567
§ 371 (c)(1),
(2) Date: Oct. 15, 2019

(87) PCT Pub. No.: WO2019/003298
PCT Pub. Date: Jan. 3, 2019

(65) Prior Publication Data
US 2021/0126757 A1    Apr. 29, 2021

(51) Int. Cl.
*H04L 27/22*     (2006.01)
*H04L 5/00*      (2006.01)
(Continued)

(52) U.S. Cl.
CPC ......... *H04L 5/0057* (2013.01); *H04B 7/0452* (2013.01); *H04B 7/0456* (2013.01); *H04W 88/085* (2013.01)

(58) Field of Classification Search
CPC ................. H04L 27/22; H04L 27/2332; H04L 2027/003; H04W 72/121; H04W 24/02; H04B 7/024
(Continued)

(56) References Cited

U.S. PATENT DOCUMENTS 10,039,099 B2    7/2018  Sato et al.
2009/0225729 A1*  9/2009  Ida .................... H04W 88/08
                                                              370/338
(Continued)

FOREIGN PATENT DOCUMENTS

CN    106797675 A     5/2017
EP    2 525 623 A2    11/2012
(Continued)

OTHER PUBLICATIONS

European Communication pursuant to Article 94(3) EPC for European Application No. 17915567.6, dated Dec. 8, 2020.
(Continued)

*Primary Examiner* — Khai Tran
(74) *Attorney, Agent, or Firm* — Birch, Stewart, Kolasch & Birch, LLP

(57) ABSTRACT

A lower base station according to the present invention includes: a CSI acquisition unit that acquires channel information indicating a channel state between the lower base station and one or more mobile terminals; a lower scheduler unit that transmits the channel information to a higher base station, and determines the number of signal streams and a modulation and coding scheme for a destination terminal that is a mobile terminal selected from among the one or more mobile terminals, based on the destination terminal and a data transmission rate for the destination terminal, sent for notification by the higher base station; and an MU-MIMO signal processing unit that performs Multi User-
(Continued)

Multiple Input Multiple Output precoding for the mobile terminal.

12 Claims, 5 Drawing Sheets

(51) Int. Cl.
 *H04B 7/0452* (2017.01)
 *H04B 7/0456* (2017.01)
 *H04W 88/08* (2009.01)

(58) Field of Classification Search
 USPC .......................................................... 375/329
 See application file for complete search history.

(56) References Cited

U.S. PATENT DOCUMENTS

| | | |
|---|---|---|
| 2010/0296591 A1 | 11/2010 | Xu et al. |
| 2012/0218947 A1 | 8/2012 | Merlin et al. |
| 2013/0115989 A1* | 5/2013 | Yamazaki ............. H04W 88/00 455/507 |
| 2013/0279617 A1 | 10/2013 | Xu et al. |
| 2015/0327287 A1 | 11/2015 | Kim et al. |
| 2016/0142924 A1* | 5/2016 | Uchino ................. H04L 5/0064 455/422.1 |
| 2018/0091206 A1* | 3/2018 | Bhattad ................ H04B 7/0421 |

FOREIGN PATENT DOCUMENTS

| | | |
|---|---|---|
| EP | 3 163 974 A1 | 5/2017 |
| JP | 4965662 B2 | 7/2012 |
| JP | 2013-543291 A | 11/2013 |
| JP | 2015-82751 A | 4/2015 |

OTHER PUBLICATIONS

Choi et al., "A transmit preprocessing technique for multiuser MIMO systems using a decomposition approach", IEEE Transactions on Wireless Communications, Jan. 2004, vol. 3, No. 1, pp. 20-24.

Harashima et al., "Matched-transmission technique for channels with intersymbol interference", IEEE Transactions on Communications, Aug. 1972, vol. 20, No. 4, pp. 774-780.

Nishimoto et al., "Block Lower Multi-diagonalization for Multiuser MIMO Downlink", Proc. IFFF WCNC 2016 Workshop, Apr. 2016, pp. 342-347.

Nishimoto et al., "Nonlinear Block Multi-Diagonalization Precoding for High SHF Wide-band Massive MIMO in 5G", Proc. IEEE PIMRC 2016, Sep. 2016, pp. 667-673.

Peh et al., "Power and modulo loss tradeoff with expanded soft demapper for LDPC coded GMD-THP MIMO systems" IEEE Transactions on Wireless Communications, Feb. 2009, vol. 8, No. 2, pp. 714-724.

Rim, "Multi-user downlink beamforming with multiple transmit and receive antennas", Electronics Letters, Dec. 2002, vol. 38, No. 25, pp. 1725-1726.

Extended European Search Report issued in corresponding European Application No. 17915567.6 dated Feb. 28, 2020.

Office Action issued in corresponding Chinese Application No. 201780092268.4 dated Jun. 18, 2021.

* cited by examiner

LOWER RADIO BASE STATION, HIGHER RADIO BASE STATION, AND RADIO BASE STATION SYSTEM

FIELD

The present invention relates to a lower radio base station, a higher radio base station, and a radio base station system in a wireless communication system to which a Multi-User Multiple-Input Multiple-Output scheme is applied.

BACKGROUND

In recent years, researches on technology to which the fifth-generation mobile communication system is applied, and activities for standardization of the fifth-generation mobile communication system have been intensified. The traffic volume of mobile communication systems in the 2020s is expected to be 1000 times or more of that in 2010. Therefore, there has been a growing interest in effective use of radio resources and improvement of transmission efficiency toward the realization of the fifth-generation mobile communication system that can increase transmission quantity by ensuring a wide frequency width.

As an example of a method for effective use of radio resources and improvement of transmission efficiency in the fifth-generation mobile communication system, a technique described in Non Patent Literature 1 can be cited. Non Patent Literature 1 discloses, as a wireless communication system that realizes high-speed transmission in a limited frequency band, a multi-user MIMO (MU-MIMO) system in which a Space Division Multiple Access (SDMA) scheme is applied to a Multiple-Input Multiple-Output (MIMO) system in which a plurality of antennas are installed at both transmitters and receivers. The MU-MIMO system includes a base station having a plurality of antennas, and a plurality of terminals having a plurality of antennas, in which system the base station performs simultaneous transmission to the plurality of terminals in the same radio frequency band.

CITATION LIST

Non Patent Literature

Non Patent Literature 1: Hiroshi Nishimoto, Akinori Taira, Hiroki Iura, Shigeru Uchida, Akihiro Okazaki, Atsushi Okamura, "Nonlinear Block Multi-Diagonalization Precoding for High SHF Wide-band Massive MIMO in 5G", Proc. IEEE PIMRC 2016, pp. 667-673, September 2016.

SUMMARY

Technical Problem

However, the fifth-generation mobile communication is expected to use radio waves in a higher frequency band than conventional mobile communication, that is, the fourth-generation mobile communication and earlier. Radio waves in higher frequencies have higher straightness, resulting in greater attenuation with respect to propagation distance. Because a radio wave of a high frequency is interrupted when a hitting structure such as a building, and a propagation distance over which one base station can transmit a radio wave in a receivable manner is short, it is expected that in the fifth-generation mobile communication, a communication area covered by one base station, i.e., a cell will be smaller than before, and the number of base stations will increase compared to that in the fourth-generation mobile communication or earlier. For this reason, it is desirable that a base station forming each cell, that is, a base station that can establish wireless connection with a mobile terminal be realized with a simple configuration. Therefore, it is expected to be a challenge to minimize the load of processing performed by a base station that can make wireless connection with a mobile terminal.

The present invention has been made in view of the above circumstances, and its object is to provide a lower radio base station capable of minimizing a processing load in a base station that can establish wireless connection with a mobile terminal.

Solution to Problem

In order to solve the above-mentioned problems and achieve the object, the present invention provides a lower radio base station comprising: an acquisition unit to acquire channel information indicating a channel state between the lower radio base station and one or more mobile terminals; a scheduler unit to transmit the channel information to a higher radio base station, and determine the number of signal streams and a modulation and coding scheme for a destination terminal that is a mobile terminal selected from among the one or more mobile terminals, based on the destination terminal and a data transmission rate for the destination terminal sent for notification by the higher radio base station; and a signal processing unit to perform Multi User-Multiple Input Multiple Output precoding for the mobile terminal.

Advantageous Effects of Invention

The lower radio base station according to the present invention has an advantageous effect of being able to minimize a processing load on a base station that can establish wireless connection with a mobile terminal.

DESCRIPTION OF EMBODIMENTS

Hereinafter, a lower radio base station, a higher radio base station, and a radio base station system will be described in detail with reference to the drawings. Note that the embodiments are not intended to limit the invention.

First Embodiment

Figure 1:
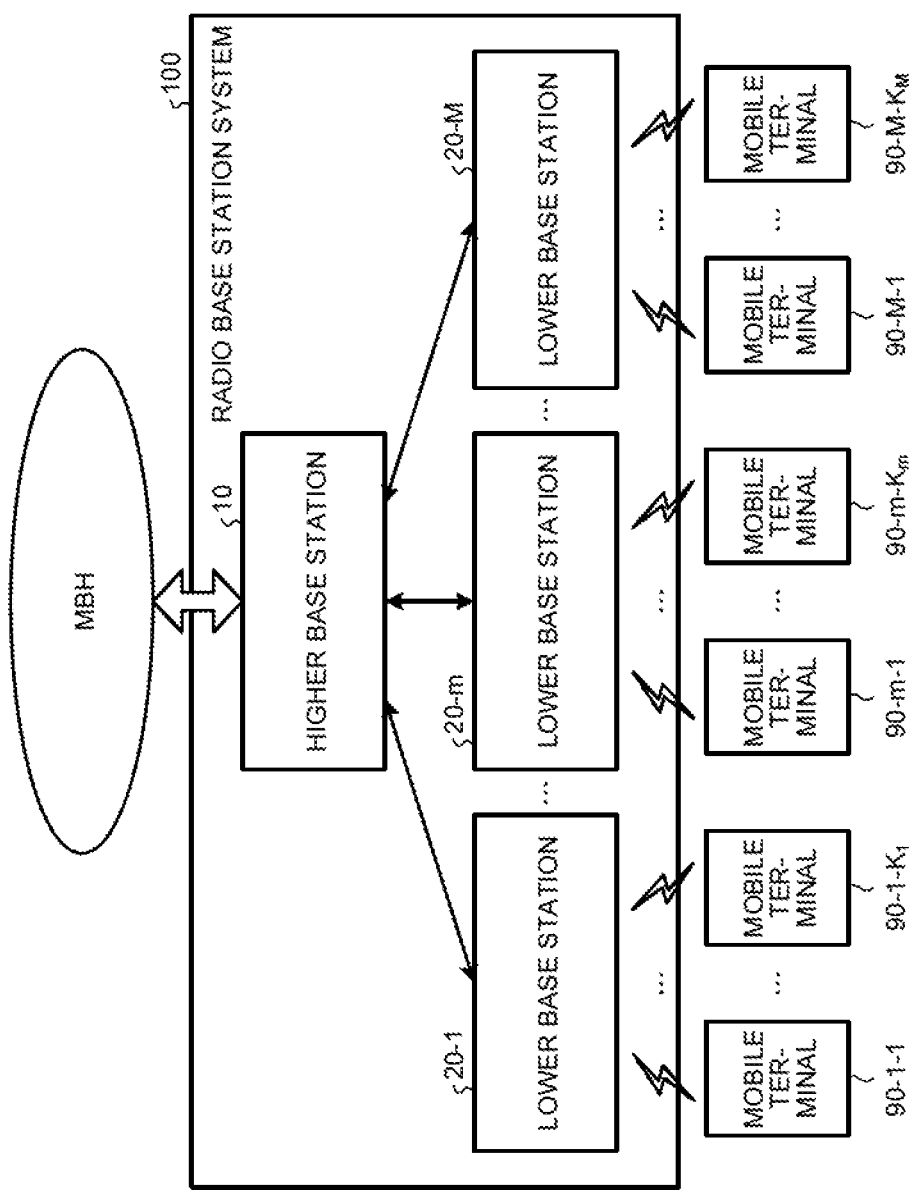
FIG. 1 is a diagram illustrating a configuration example of a radio base station system according to a first embodiment.

FIG. 1 is a diagram illustrating a configuration example of a radio base station system according to a first embodiment.

A radio base station system 100 includes a higher base station 10 and lower base stations 20-1 to 20-M (M is an integer greater than or equal to one). The higher base station 10 performs higher scheduling described later. When the lower base stations 20-1 to 20-M are mentioned without distinction, they are referred to as a lower base station 20 case by case. The lower base station 20 performs lower scheduling described later.

The radio base station system 100 connects to a Mobile Back Haul (MBH) to transmit and receive data to and from the MBH. The MBH is a network that connects between sites in each of which a higher network device such as Serving General-packet-radio-service Support Node (SGSN) is installed and base stations. The SGSN is one of nodes constituting a core network of mobile terminals, and performs authentication of a user at the time of packet communication, and control on information such as an Internet Protocol (IP) address.

There are mobile terminals 90-1-1 to 90-M-$K_M$ in cells formed by the lower base stations 20 included in the radio base station system 100. There are $K_m$ ($K_m$ is an integer greater than or equal to one) mobile terminals 90-$m$-1 to 90-$m$-$K_m$ in a cell formed by a lower base station 20-$m$ (m is an integer of 1≤m≤M). Downlink data for terminals, that is, data in communication in a direction from a base station to the terminals is inputted from the MBH to the radio base station system 100, and is transmitted from the radio base station system 100 to the terminals. An MU-MIMO scheme is applied to the radio base station system 100 of the present embodiment.

Here, a typical MU-MIMO system will be described. In a downlink in the MU-MIMO system (hereinafter, referred to as MU-MIMO downlink), signals are concurrently sent from a base station to the terminals. In the present invention, the MU-MIMO scheme is not applied to the uplink.

Communication performance in the MU-MIMO downlink greatly depends on the transmission channel states between the base station and the terminals. Therefore, the base station needs to determine a combination of terminals for which transmission is to be performed in the MU-MIMO downlink, the number of signal streams used for the downlink transmission to each terminal, that is, the number of ranks (Rank Indicator: RI), a modulation scheme for a stream of each signal, and a Modulation and Coding Scheme (MCS) that is an error-correction coding scheme. This is because the RI and the MCS need to be determined according to the transmission channel state. Signal stream means a spatially multiplexed signal sequence to be transmitted to each terminal by the base station. The RI represents the number of signal streams used in standards such as IEEE 802.11n and LTE-Advanced, and the MCS is an index indicating a combination of the number of signal streams, a data rate, and the like.

The base station determines a data transmission rate using the modulation scheme and the error-correction coding scheme of the determined MCS. Processing to determine a combination of terminals for which transmission is to be performed in the MU-MIMO downlink, the number RI of signal streams used for the downlink transmission to each terminal, and the MCS for each signal stream is generally called scheduling. A processing unit for performing the scheduling is generally called a scheduler.

The base station is provided with a CSI acquisition unit that acquires transmission channel information indicating the channel state for each terminal necessary for the scheduling, that is, Channel State Information (CSI). Here, CSI refers to a MIMO channel matrix between base station antenna ports and terminal antenna ports represented, in a complex number notation, but is not limited to this example, and may be, for example, a channel matrix represented in a real number notation.

The base station can acquire the CSI on each terminal by estimating a CSI using an uplink signal transmitted from the terminal to the base station. A method by which the base station acquires the CSI on each terminal is not limited to this example, and may be, for example, another method in which a CSI estimate value obtained by estimation on the terminal side is fed back from the terminal side to the base station.

The base station performs radio signal processing for the MU-MIMO downlink, that is, MU-MIMO signal processing, based on the information determined by the scheduler, and transmits MU-MIMO downlink signals from a plurality of antennas equipped in the base station. The MU-MIMO signal processing includes precoding that spatially multiplexes, for all terminals, a plurality of signal streams produced by error-correction coding and primary modulation on a data signal for each terminal. However, the MU-MIMO signal processing is not limited to such precoding, and may be any processing as long as it is radio signal processing for implementing the MU-MIMO downlink.

In the typical MU-MIMO system described so far, the base station is not hierarchized. In the radio base station system 100 of the present embodiment, functions of the scheduler of the base station in the typical MU-MIMO system are distributed to the higher base station 10 and the lower base station 20. That is, the scheduler of the base station in the typical MU-MIMO system is divided into one part for a higher scheduler unit 12 of the higher base station 10 and another part for a lower scheduler unit 21 of the lower base station 20. The CSI acquisition unit included in the base station of the typical MU-MIMO system is included in the lower base station 20. The MU-MIMO signal processing is performed by the lower base station 20. The details of the higher base station 10 and the lower base station 20 of the present embodiment will be described later.

Figure 2:
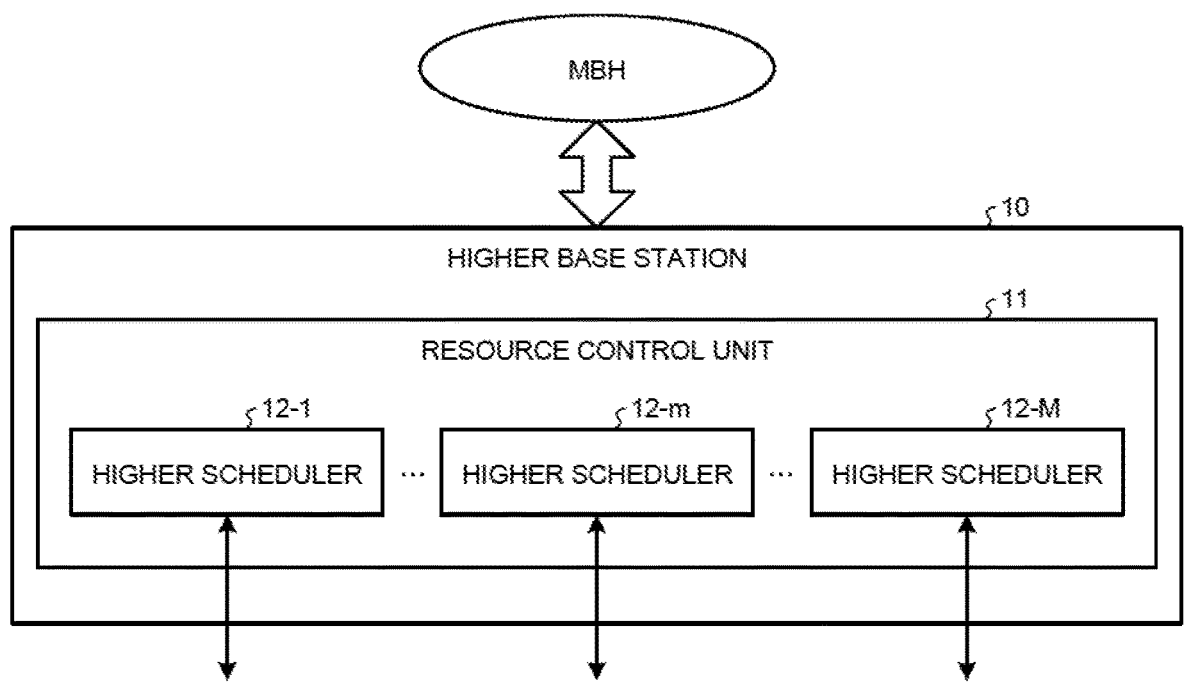
FIG. 2 is a diagram illustrating a configuration example of a higher base station according to the first embodiment.

FIG. 2 is a diagram illustrating a configuration example of the higher base station 10 according to the first embodiment. The higher base station 10 includes a resource control unit 11. The resource control unit 11 includes M higher scheduler units 12-1 to 12-M corresponding to the M lower base stations 20, respectively. When the higher scheduler units 12-1 to 12-M are mentioned without distinction, they are referred to as higher schedulers 12 case by case.

The higher scheduler unit 12-$m$ selects, from the $K_m$ mobile terminals, $L_m$ mobile terminals ($L_m$ is an integer between one and $K_m$, inclusive) for which data transmission is to be performed actually. A method of the selection considers terminal capacity indices or CSI for the $K_m$ terminals sent for notification from the lower base station 20-$m$, and data transmission rates or required values of data transmission amounts (or waiting buffer amounts for data transmission) for the $K_m$ mobile terminals inputted from the MBH. The higher scheduler unit 12-$m$ determines the data transmission rate or the data transmission amount for each mobile terminal. This processing is referred to as higher scheduling. The terminal capacity index of each mobile terminal is of a real scalar quantity, the details of which will be described later.

The higher scheduler unit 12-$m$ notifies the lower base station 20-$m$ of the selected destination terminals and the required data transmission rate for each of the destination terminal. The destination terminals are the $L_m$ mobile terminals selected by the higher scheduler unit 12-$m$. As a specific algorithm for the higher scheduling, for example, there is a method in which the higher scheduler unit 12-$m$ selects, from mobile terminals having a required terminal capacity index or higher among the $K_m$ mobile terminals, the $L_m$ destination terminals in descending order of data transmission required values. For the required data transmission rate for a selected destination terminal, the maximum data transmission rate among those that do not exceed the terminal capacity index of the destination terminal can be used, but this example does not necessarily limit the invention.

Figure 3:
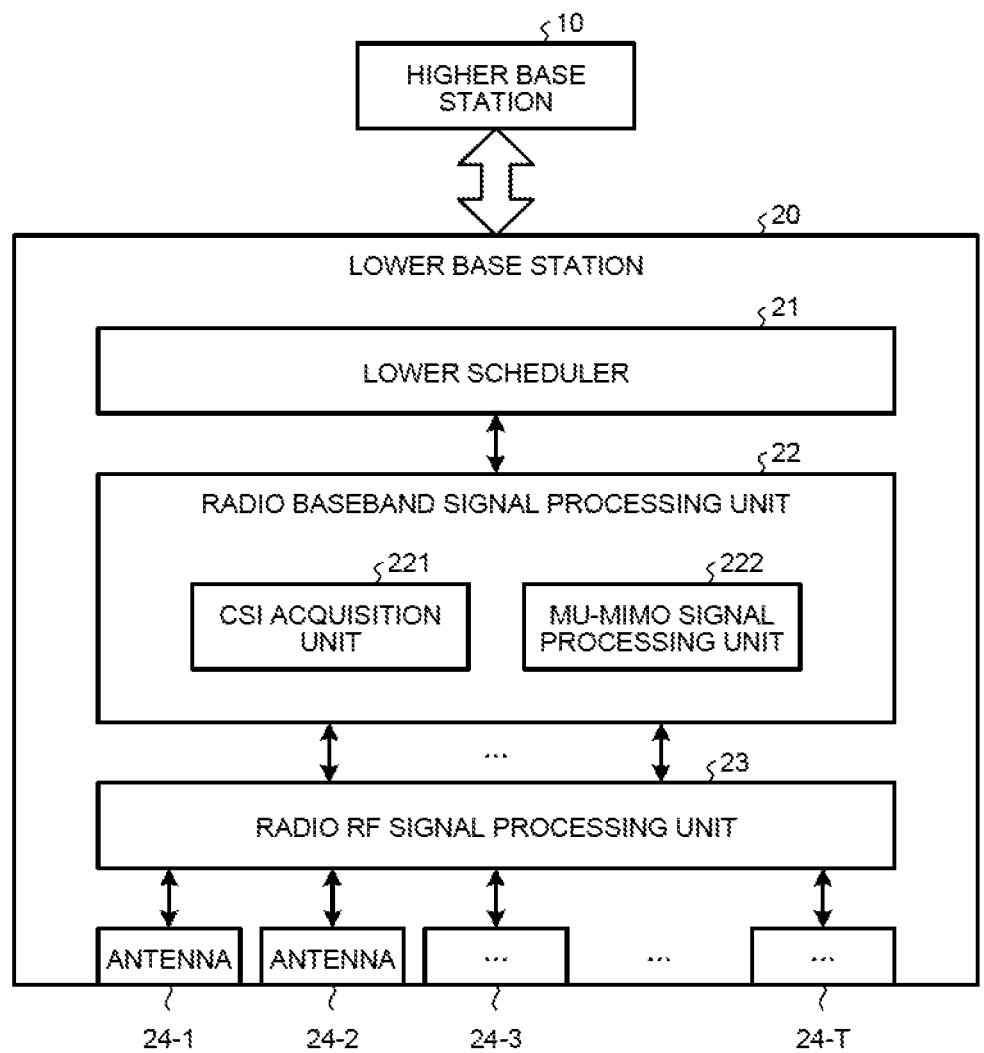
FIG. 3 is a diagram illustrating a configuration example of a lower base station according to the first embodiment.

FIG. 3 is a diagram illustrating a configuration example of the lower base station 20 according to the first embodiment. Here, of the M lower base stations 20, the lower base station 20-$m$ will be described as an example. The lower base stations 20-1 to 20-M all have the same configuration. The number of antennas provided in the lower base station 20-$m$ is $T_m$ ($T_m$ is an integer greater than or equal to one), and the number of mobile terminals existing in the cell formed by the lower base station 20-$m$ is $K_m$.

The lower base station 20-$m$ includes the lower scheduler unit 21, a radio baseband signal processing unit 22, a radio Radio Frequency (RF) signal processing unit 23, and $T_m$ antennas 24-1 to 24-$T_m$. The radio baseband signal processing unit 22 includes a CSI acquisition unit 221 and an MU-MIMO signal processing unit 222. The CSI acquisition unit 221 is simply referred to as an acquisition unit case by case. The MU-MIMO signal processing unit 222 is simply referred to as a signal processing unit case by case. The radio RF signal processing unit 23 is simply referred to as a radio signal processing unit case by case.

The CSI acquisition unit 221 acquires CSI by estimation from uplink signals from the mobile terminals 90-$m$-1 to 90-$m$-$K_m$ to the lower base station 20-$m$, and inputs the CSI to the lower scheduler unit 21. The used estimation method is not particularly limited, and any typical method may be used therefor. The MU-MIMO signal processing unit 222 generates MU-MIMO downlink baseband signals to the $L_m$ destination terminals selected by the higher scheduler unit 12. The radio RF signal processing unit 23 converts the MU-MIMO downlink baseband signals into radio signals of radio RF frequencies. The antennas 24-1 to 24-$T_m$ transmit the radio RF signals to the destination terminals.

The lower scheduler unit 21 abstracts the value of the CSI of each of the $K_m$ terminals inputted from the CSI acquisition unit 221 as a channel capability of the terminal, that is, converts it into a single real scalar quantity so that the higher scheduler unit 12-$m$ can easily handle it. The channel capability refers to a capacity of data that can be downlink-transmitted to the terminal. In general, the transmission channel capability can be generally calculated from the channel information. In the future, it is expected that the number of terminals and the number of antennas will increase, and so the amount of information of transmission channel information itself will increase and then the transmission of the channel information itself can tighten lines. Using a single real scalar quantity representing a capacity of data that can be downlink-transmitted to the terminal instead of the channel information itself can prevent the tightness of the lines. The lower scheduler unit 21 transmits, to the higher scheduler unit 12, a terminal capacity index that is a CSI obtained after conversion into the single real scalar quantity. Note that the lower scheduler unit 21 can transmit the CSI instead of the terminal capacity index to the higher scheduler unit 12.

Scalar quantity that can express the characteristics of a CSI, that is, can abstract them includes a MIMO transmission capacity. The MIMO transmission capacity is also called communication capacity, channel capacity, or Shannon capacity.

In the present embodiment, parameters $\alpha_m$ ($0 \leq \alpha_m \leq 1$) and $\beta_m$ ($0 \leq \beta_m \leq 1$) are taken into the MIMO transmission capacity, to define it as a terminal capacity index. The lower scheduler unit 21 calculates the terminal capacity index $C_{m,j}(f)$ of a mobile terminal 90-$m$-$j$ ($1 \leq j \leq K_m$) based on the following formula where $H_{m,j}(f)$ (matrix size: the number of rows is the number of receiving antennas of the mobile terminal 90-$m$-$j$, and the number of columns is $T_m$) is the CSI at a radio RF frequency f between the lower base station 20-$m$ and the mobile terminal 90-$m$-$j$, that is, the MIMO channel matrix. The radio RF frequency is a radio frequency determined to be used by the lower base station 20-$m$. In the present specification, characters representing a matrix are expressed in a bold face in formulas, but they are expressed using ordinary characters in the text.

[Formula 1]

$$c_{m,j}(f) = \alpha_m \log_2 \det\left[I + \frac{P_m(f) H_{m,j}(f) B_{m,j}(f) B_{m,j}^H(f) H_{m,j}^H(f)}{\beta_m \Omega_j(f) + \sigma_j^2 I}\right] \quad (1)$$

Here, $P_m(f)$ is a transmission power at the radio RF frequency f used for transmission from the lower base station 20-$m$, $B_m(f)$ is a precoding matrix (matrix size: the number of rows is $T_m$, and the number of columns is the total rank number), $\Omega_j(f)$ is a covariance matrix determined from transmission channel information on a component with interference of the mobile terminal 90-$m$-$j$ (a Hermitian matrix with the number of receiving antenna ports of the mobile terminal 90-$m$-$j$ being set as the order of the matrix), $\sigma_j^2$ is a thermal noise power of the mobile terminal 90-$m$-$j$, and I is an identity matrix with the number of receiving antenna ports of the mobile terminal 90-$m$-$j$ being set as the order of the matrix. The terminal capacity index $C_{m,j}(f)$ is an index indicating the data rate at which transmission to the terminal is possible.

$B_m(f)$ is a matrix determined by the precoding method, and is, for example, a precoding matrix in Block Diagonalization, Block Multi-diagonalization, or the like described in Non Patent Literature 1. $B_{m,j}(f)$ is a submatrix of $B_m(f)$, and is a precoding submatrix for the mobile terminal 90-$m$-$j$ (matrix size: the number of rows is $T_m$, and the number of columns is the number of receiving antenna ports of the mobile terminal 90-$m$-$j$). $\Omega_j(f)$ can be calculated based on the following formula (2), for example. $\Omega_j(f)$ is obtained by removing, from a reception correlation matrix determined using the CSI when the precoding matrix $B_m(f)$ for all the mobile terminals is applied, a reception correlation matrix component determined using the CSI when the precoding submatrix $B_{m,j}(f)$ for the mobile terminal 90-$m$-$j$ is applied. $\sigma_j^2$ is determined in advance by measurement at the terminal, for example.

[Formula 2]

$$\Omega_{k_m}(f) = H_{m,j} B_m(f) B_m^H(f) H_{m,j}^H(f) - H_{m,j}(f) B_{m,j}(f) B_{m,j}^H(f) H_{m,j}^H(f) \quad (2)$$

$\alpha_m$ and $\beta_m$ are fixed coefficients determined by requirements of the lower base station 20-$m$. If $\alpha_m$ is increased, terminal capacity index approaches the MIMO transmission capacity value that is an ideal value. If $\alpha_m$ is decreased, the terminal capacity index is estimated to be lower than the MIMO transmission capacity value that is the ideal value. If $\beta_m$ is increased, the effect of interference is strongly reflected. If $\beta_m$ is decreased, the effect of interference is supposed to be estimated to be lower.

When notifying the higher base station 10 of CSI, the lower base station 20 has had to notify the higher base station 10 of as many CSI pieces as the number of matrix elements of the MIMO channel matrix $H_{m,j}(f)$ for each terminal. By abstracting CSI into $C_{m,j}(f)$ that is a real scalar quantity based on formula (1), the amount of information transmission related to the notification can be reduced to 1/(the number of matrix elements of $H_{m,j}(f) \times 2$). For example, assuming that the number of receiving antenna ports of the mobile terminal 90-$m$-$j$ is four, and the number of antenna ports of the lower base station 20-$m$ is $N_m=16$, the abstraction (converting CSI into a single real scalar quantity) can reduce the amount of information transmission to 1/128 as compared to the case where CSI (a complex number matrix) is used for the notification as is.

For the $L_m$ destination terminals receiving notification from the higher scheduler unit 12-$m$ of the higher base station 10, the lower scheduler unit 21 determines the RI and the MCS for each destination terminal, based on the required data transmission rate for each destination terminal, the required data transmission rate being sent together for the notification. This processing procedure is referred to as lower scheduling. It can be also said that the lower scheduling is a scheduler that determines the number of signal streams and the modulation and coding scheme for each destination terminal that is a mobile terminal selected from among the one or more mobile terminals receiving notification from the higher base station 10, based on the destination terminal and the data transmission rate for the destination terminal.

Specific examples of a lower scheduling method will be illustrated. As a first example, the RI and the MCS are determined for each terminal to satisfy the required data transmission rate, in ascending order of required data transmission rates sent for the notification. This is subject to the limiting conditions that the RI is set to as small a value as possible of the number of streams that can be received by the destination terminal, and the total number of RIs of all the $L_m$ terminals does not exceed the number of antenna ports $N_m$ of the lower base station 20-$m$. In this way, the RI and the MCS are determined for the destination terminals in order.

As a second example of a lower scheduling method, for the $L_m$ destination terminals, the Signal-to-Noise power Ratio (SNR) or the Signal-to-Interference-and-Noise power Ratio (SINR) of each stream for each destination terminal when the MU-MIMO precoding is applied is estimated, and the RI and the MCS are determined to satisfy the required data transmission rate for each destination terminal. Although the two lower scheduling methods are described for examples here, the present invention is not limited to them, and any other lower scheduling algorithms may be used therefor.

Although the MU-MIMO signal processing unit 222 performs the MU-MIMO precoding, there are no restrictions on the precoding method therefor. Linear precoding represented by block diagonalization may be performed, or non-linear precoding represented by Tomlinson Harashima Precoding (THP) may be performed. When non-linear precoding is applied, the lower scheduler unit 21 also determines the order of the $L_m$ destination terminals. Criteria for the determination include, for example, the order of magnitudes of terminal capacity indices, the order of angles of the terminals when viewed from the lower base station 20, the order of increasing or decreasing geographical proximity in positional relationship between the terminals, and the order of moving speeds of the terminals, but these examples do not necessarily limit the invention.

The hardware configuration of the radio base station system 100 according to the first embodiment will be described. The resource control unit 11, the higher scheduler unit 12, the lower scheduler unit 21, the radio baseband signal processing unit 22, the CSI acquisition unit 221, and the MU-MIMO signal processing unit 222 are implemented by a processing circuit that is electronic circuitry performing various processings. The radio RF signal processing unit 23 corresponds to a transmitter and a receiver.

The said processing circuit may be a dedicated hardware set, or a control circuit including a memory and a Central Processing Unit (CPU) that executes programs stored in the memory. Here, the memory corresponds, for example, to nonvolatile or volatile semiconductor memory such as a Random Access Memory (RAM), a Read Only Memory (ROM), or a flash memory, or a magnetic disk, an optical disk, or the like. The control circuit is, for example, a control circuit 400 having a configuration illustrated in FIG. 4. When the processing circuit is a dedicated hardware set, the processing circuit is, for example, an Application Specific Integrated Circuit (ASIC), a Field Programmable Gate Array (FPGA), or any combination thereof.

Figure 4:
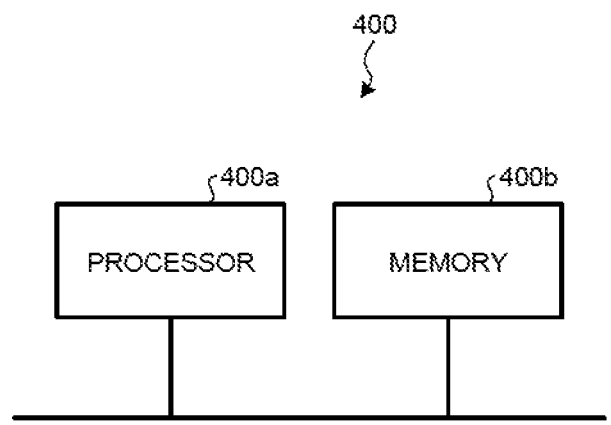
FIG. 4 is a diagram illustrating a configuration example of a control circuit for the first embodiment.

As illustrated in FIG. 4, the control circuit 400 includes a processor 400$a$ that is a CPU, and a memory 400$b$. When realization is based on the control circuit 400 illustrated in FIG. 4, the realization is specifically achieved by the processor 400$a$ reading and executing programs stored in the memory 400$b$, the programs corresponding to the various processings. The memory 400$b$ is also used as a temporary memory in the various processings executed by the processor 400$a$.

In the fourth-generation mobile communication, a single base station performs processing to determine a combination of terminals for which MU-MIMO downlink transmission is performed, the number RI of signal streams used for transmission in downlink to each terminal, and the MCS for each signal stream. In the fifth-generation mobile communication, radio waves having higher frequencies than in the fourth-generation mobile communication are used, so that the number of base stations forming cells is expected to increase. Therefore, it is desirable that each base station is implemented with a simpler configuration. For this, it becomes a challenge to minimize a processing load in each base station. In the present embodiment, the processings performed by a single base station in the fourth-generation mobile communication are divided between the higher base station 10 and the lower base station 20. More specifically, the higher base station 10 performs processing to determine a combination of terminals for which the MU-MIMO downlink transmission is performed, and the lower base station 20 performs processing to determine the number RI of signal streams used for transmission in downlink to each terminal, and the MCS for each signal stream. In this way, sharing and performing the processings performed by a single base station in the fourth-generation mobile communication between the higher base station 10 and the lower base station 20 achieve distribution of the load of processing. Consequently, the processing load in the lower base stations 20 that are base stations forming cells can be minimized.

Further, the higher scheduler unit 12 selects L terminals from K terminals and determines the data transmission rate for each terminal, and the lower scheduler unit 21 determines the RI and the MCS for the L terminals. By virtue of using a terminal capacity index that is a real scalar quantity for information notification between the higher scheduler unit 12 and the lower scheduler unit 21, the amount of information transmission can be reduced as compared to the case where CSI is sent for notification.

Second Embodiment

Figure 5:
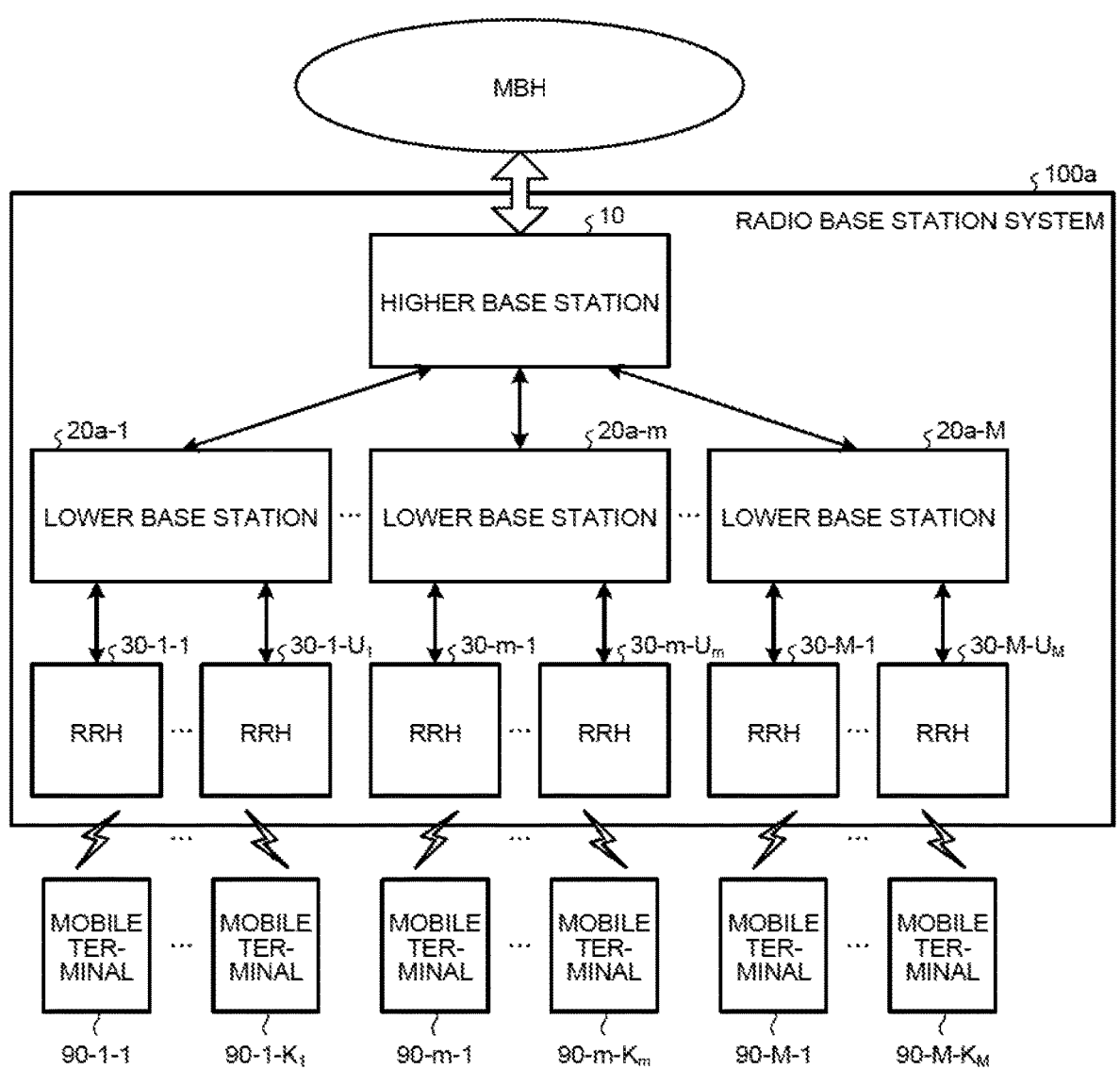
FIG. 5 is a diagram illustrating a configuration example of a radio base station system according to a second embodiment.

FIG. 5 is a diagram illustrating a configuration example of a radio base station system according to a second embodiment. The difference between the radio base station system 100 and a radio base station system 100a is that the radio RF signal processing unit 23 and the antennas 24 constituting the lower base station 20 of the radio base station system 100 are configured to be independent as a plurality of Remote Radio Heads (RRHs) 30 located outside a lower base station 20a. Different portions will be mainly described without description of common portions. The RRH 30 is a radio device that transmits and receives a radio signal.

The lower base station 20-m in the first embodiment is divided into a lower base station 20a-m and $U_m$ ($U_m$ is an integer greater than or equal to one) RRHs 30-m-1 to 30-m-$U_m$ in the present embodiment. Here, an RRH 30-m-$u_m$ ($u_m$ is an integer between one and $U_m$, inclusive) has $V_m$ ($V_m$ is an integer between one and $T_m$, inclusive) antennas 32-m-1 to 32-m-$V_m$, and the sum of $V_m$ corresponds to $T_m$ described in the first embodiment ($T_m = \Sigma_m V_m$). In the following, the RRHs 30-m-1 to 30-m-$U_m$ have equal configurations. When the RRHs 30-m-1 to 30-m-$U_m$ are mentioned without distinction, they are expressed as RRHs 30.

Figure 6:
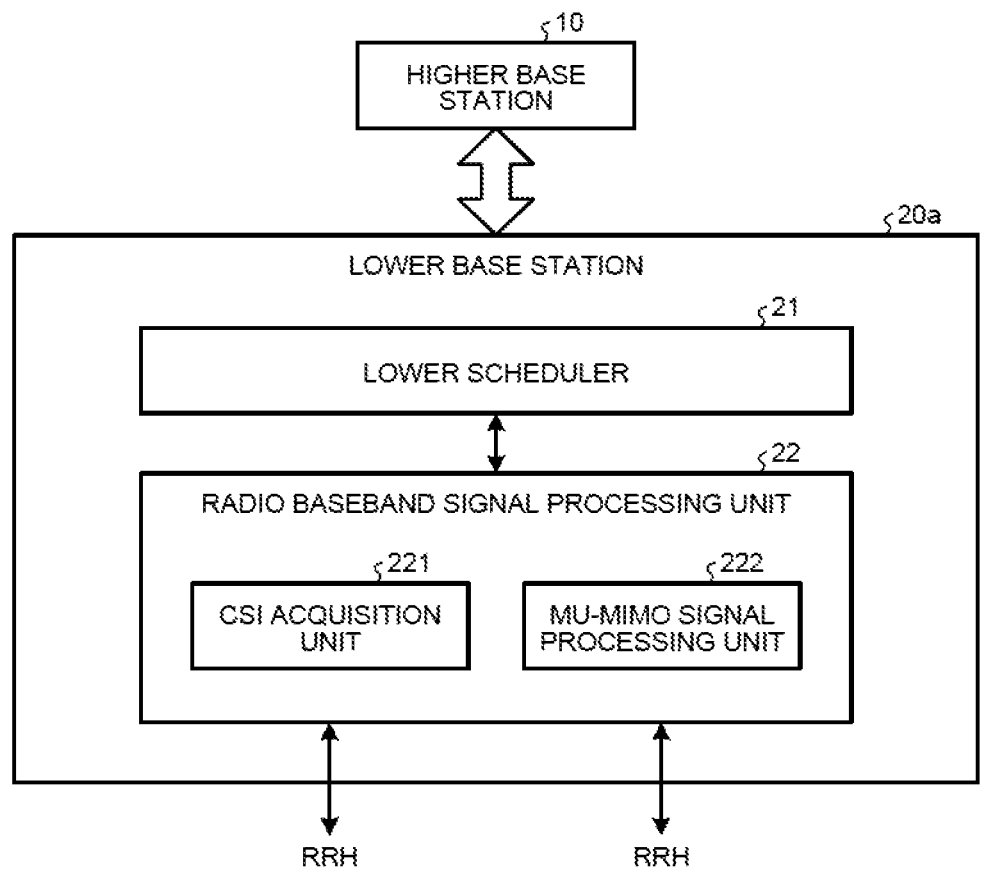
FIG. 6 is a diagram illustrating a configuration example of a lower base station according to the second embodiment.

FIG. 6 is a diagram illustrating a configuration example of the lower base station 20a according to the second embodiment. The lower base station 20a is constructed of the lower scheduler unit 21 and the radio baseband signal processing unit 22. These units have the same functions as the lower scheduler unit 21 and the radio baseband signal processing unit 22 in the first embodiment. Radio baseband signals generated by the radio baseband signal processing unit 22 are outputted to the external RRHs 30.

Figure 7:
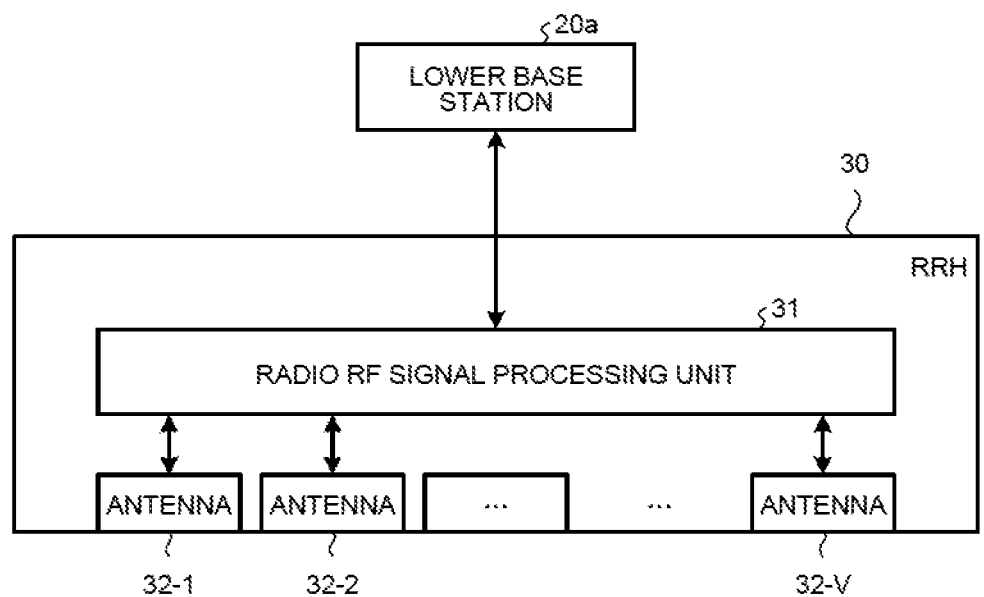
FIG. 7 is a diagram illustrating a configuration example of an RRH according to the second embodiment.

FIG. 7 is a diagram illustrating a configuration example of the RRH 30 according to the second embodiment. The RRH 30 includes a radio RF signal processing unit 31 and V (V is an integer greater than or equal to one) antennas 32-1 to 32-V. The radio RF signal processing unit 31 receives radio baseband signals from the lower base station 20a, convert them into radio RF signals, and transmits them from the antennas 32-1 to 32-V.

As described above, in the present embodiment, there has been described a configuration in which the antennas 32-1 to 32-V are located outside the lower base station 20a as the RRHs 30 based on the first embodiment, that is, a form of distributed antennas. Even in the configuration in which the RRHs 30 are located outside the lower base station 20a, it is possible to provide the same effects as those of the first embodiment, and also provide the effect of improving the area quality of a mobile communication system in an indoor environment such as in a building to which it is difficult for radio waves to come from an outdoor base station, by using the form of distributed antennas.

The configurations described in the above embodiments illustrate examples of the subject matter of the present invention, and can be combined with other publicly known techniques and partly omitted and/or modified without departing from the scope of the present invention.

REFERENCE SIGNS LIST 10 higher base station; 11 resource control unit; 12-1 to 12-M higher scheduler unit; 20-1 to 20-M lower base station; 21 lower scheduler unit; 22 radio baseband signal processing unit; 221 CSI acquisition unit; 222 MU-MIMO signal processing unit; 23 radio RF signal processing unit; 24-1 to 24-$T_m$, 32-1 to 32-V antenna; 30-m-1 to 30-m-$U_m$ RRH; 90-1-1 to 90-M-$K_M$ mobile terminal; 100, 100a radio base station system.

The invention claimed is:

1. A lower radio base station comprising:
an acquisition unit configured to acquire channel information indicating a channel state between the lower radio base station and one or more mobile terminals;
a scheduler unit configured to transmit the channel information to a higher radio base station, and determine the number of signal streams and a modulation and coding scheme for a destination terminal that is a mobile terminal selected from among the one or more mobile terminals, based on the destination terminal and a data transmission rate for the destination terminal sent for notification by the higher radio base station; and
a signal processing unit configured to perform Multi User-Multiple Input Multiple Output precoding for the destination terminal,
wherein the channel information is a value representing a state of a channel between the lower radio base station and the mobile terminal in real scalar quantity notation.

2. The lower radio base station according to claim 1, wherein the channel information is calculated based on a transmission power of the mobile terminal, the number of antennas of the mobile terminal, a thermal noise power at the mobile terminal, and a channel matrix representing a state of the channel between the lower radio base station and the mobile terminal.

3. The lower radio base station according to claim 2, wherein the channel information is calculated as $C_{m,j}(f)$ from equation (1) below, using a channel matrix $H_{m,j}(f)$ at a radio frequency f between a lower base station 20-m and a mobile terminal 90-m-j, a transmission power $P_m(f)$ of the mobile terminal 90-m-j, a precoding matrix $B_m(f)$, a covariance matrix $\Omega_j(f)$ determined from channel information on a component with interference of the mobile terminal 90-m-j, a thermal noise power $\sigma^2_j$ of the mobile terminal 90-m-j, an identity matrix I with the number of receiving antenna ports of the mobile terminal 90-m-j being set as the order of the matrix, and weighting values $\alpha_m$ and $\alpha_m$.

$$c_{m,j}(f) = \alpha_m \log_2 \det\left[ I + \frac{P_m(f)H_{m,j}(f)B_{m,j}(f)B^H_{m,j}(f)H^H_{m,j}(f)}{\beta_m \Omega_j(f) + \sigma^2_j I} \right]. \quad (1)$$

4. A higher radio base station comprising a scheduler unit configured to determine a destination terminal to which data is to be transmitted by a lower radio base station and a data transmission rate for the destination terminal, based on a waiting buffer amount of transmission data to be transmitted to a mobile terminal, and channel information indicating a channel state with respect to the mobile terminal, sent for notification from the lower radio base station, and to notify the lower radio base station of the destination terminal and the data transmission rate,
wherein the channel information is a value representing a state of a channel between the lower radio base station and the mobile terminal in real scalar quantity notation.

5. A radio base station system comprising:
the lower radio base station, comprising:
- an acquisition unit configured to acquire channel information indicating a channel state between the lower radio base station and one or more mobile terminals;
- a scheduler unit configured to transmit the channel information to a higher radio base station, and determine the number of signal streams and a modulation and coding scheme for a destination terminal that is a mobile terminal selected from among the one or more mobile terminals, based on the destination terminal and a data transmission rate for the destination terminal sent for notification by the higher radio base station; and
- a signal processing unit configured to perform Multi User-Multiple Input Multiple Output precoding for the destination terminal; and the higher radio base station according to claim 4.

6. The radio base station system according to claim 5, wherein the channel information is calculated based on a transmission power of the mobile terminal, the number of antennas of the mobile terminal, a thermal noise power at the mobile terminal, and a channel matrix representing a state of the channel between the lower radio base station and the mobile terminal.

7. The radio base station system according to claim 6, wherein the channel information is calculated as $C_{m,j}(f)$ from equation (1) below, using a channel matrix $H_{m,j}(f)$ at a radio frequency f between a lower base station 20-m and a mobile terminal 90-m-j, a transmission power $P_m(f)$ of the mobile terminal 90-m-j, a precoding matrix $B_m(f)$, a covariance matrix $\Omega_j(f)$ determined from channel information on a component with interference of the mobile terminal 90-m-j, a thermal noise power $\sigma^2_j$ of the mobile terminal 90-m-j, an identity matrix I with the number of receiving antenna ports of the mobile terminal 90-m-j being set as the order of the matrix, and weighting values $\alpha_m$ and $\beta_m$.

$$c_{m,j}(f) = \alpha_m \log_2 \det \left[ I + \frac{P_m(f)H_{m,j}(f)B_{m,j}(f)B^H_{m,j}(f)H^H_{m,j}(f)}{\beta_m \Omega_j(f) + \sigma^2_j I} \right]. \quad (1)$$

8. A radio base station system comprising:
the lower radio base station, comprising:
- an acquisition unit configured to acquire channel information indicating a channel state between the lower radio base station and one or more mobile terminals;
- a scheduler unit configured to transmit the channel information to a higher radio base station, and determine the number of signal streams and a modulation and coding scheme for a destination terminal that is a mobile terminal selected from among the one or more mobile terminals, based on the destination terminal and a data transmission rate for the destination terminal sent for notification by the higher radio base station; and
- a signal processing unit configured to perform Multi User-Multiple Input Multiple Output precoding for the destination terminal;

the higher radio base station according to claim 4; and
a radio device to convert a baseband signal received from the lower radio base station into a radio signal, and transmit the radio signal to a mobile terminal.

9. The radio base station system according to claim 8, wherein the channel information is calculated based on a transmission power of the mobile terminal, the number of antennas of the mobile terminal, a thermal noise power at the mobile terminal, and a channel matrix representing a state of the channel between the lower radio base station and the mobile terminal.

10. The radio base station system according to claim 9, wherein the channel information is calculated as $C_{m,j}(f)$ from equation (1) below, using a channel matrix $H_{m,j}(f)$ at a radio frequency f between a lower base station 20-m and a mobile terminal 90-m-j, a transmission power $P_m(f)$ of the mobile terminal 90-m-j, a precoding matrix $B_m(f)$, a covariance matrix $\Omega_j(f)$ determined from channel information on a component with interference of the mobile terminal 90-m-j, a thermal noise power $\sigma^2_j$ of the mobile terminal 90-m-j, an identity matrix I with the number of receiving antenna ports of the mobile terminal 90-m-j being set as the order of the matrix, and weighting values $\alpha_m$ and $\beta_m$.

$$c_{m,j}(f) = \alpha_m \log_2 \det \left[ I + \frac{P_m(f)H_{m,j}(f)B_{m,j}(f)B^H_{m,j}(f)H^H_{m,j}(f)}{\beta_m \Omega_j(f) + \sigma^2_j I} \right]. \quad (1)$$

11. A control circuit to control a lower radio base station, the control circuit causing the lower radio base station to execute:
- a first step of acquiring channel information indicating a channel state between the lower radio base station and one or more mobile terminals;
- a second step of transmitting the channel information to a higher radio base station, and determining the number of signal streams and a modulation and coding scheme for a destination terminal that is a mobile terminal selected from among the one or more mobile terminals, based on the destination terminal and a data transmission rate for the destination terminal sent for notification by the higher radio base station; and
- a third step of performing Multi User-Multiple Input Multiple Output precoding for the destination terminal,
- wherein the channel information is a value representing a state of a channel between the lower radio base station and the one or more mobile terminals in real scalar quantity notation.

12. A non-transitory, computer-readable storage medium having stored therein a program which, when executed by a lower radio base station, causes the lower radio base station to execute operations comprising:
- acquiring channel information indicating a channel state between the lower radio base station and one or more mobile terminals;
- transmitting the channel information to a higher radio base station, and determining the number of signal streams and a modulation and coding scheme for a destination terminal that is a mobile terminal selected from among the one or more mobile terminals, based on the destination terminal and a data transmission rate for the destination terminal sent for notification by the higher radio base station; and
- performing Multi User-Multiple Input Multiple Output precoding for the destination terminal,
- wherein the channel information is a value representing a state of a channel between the lower radio base station and the one or more mobile terminals in real scalar quantity notation.

* * * * *